(12) United States Patent
Sikora et al.

(10) Patent No.: US 10,190,184 B2
(45) Date of Patent: Jan. 29, 2019

(54) METHOD FOR PRODUCING A PROFILE AND A MANUFACTURING SYSTEM FOR PRODUCING A PROFILE

(71) Applicants: ThyssenKrupp Steel Europe AG, Duisburg (DE); ThyssenKrupp AG, Essen (DE)

(72) Inventors: Sascha Sikora, Lunen (DE); Jorg Gorschlüter, Hamm (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 706 days.

(21) Appl. No.: 14/808,074

(22) Filed: Jul. 24, 2015

(65) Prior Publication Data

US 2016/0024605 A1    Jan. 28, 2016

(30) Foreign Application Priority Data

Jul. 25, 2014  (DE) .................. 10 2014 110 564

(51) Int. Cl.

| | | |
|---|---|---|
| *C21D 1/18* | (2006.01) | |
| *C23C 2/06* | (2006.01) | |
| *C25D 3/12* | (2006.01) | |
| *C25D 3/22* | (2006.01) | |
| *C25D 5/36* | (2006.01) | |
| *C25D 5/50* | (2006.01) | |
| *C25D 17/00* | (2006.01) | |
| *B23K 26/262* | (2014.01) | |
| *C25D 7/00* | (2006.01) | |

(52) U.S. Cl.
CPC .............. *C21D 1/18* (2013.01); *B23K 26/262* (2015.10); *C23C 2/06* (2013.01); *C25D 3/12* (2013.01); *C25D 3/22* (2013.01); *C25D 5/36* (2013.01); *C25D 5/50* (2013.01); *C25D 7/00* (2013.01); *C25D 17/00* (2013.01)

(58) Field of Classification Search
CPC ...... B21D 22/02; B21D 22/208; B21D 31/00; C21D 1/30; C21D 1/673; C21D 6/005; C21D 8/0205; C21D 9/0068
See application file for complete search history.

(56) References Cited

U.S. PATENT DOCUMENTS

| | | | | |
|---|---|---|---|---|
| 7,832,242 | B2 * | 11/2010 | Brandstatter | .......... C21D 1/673 148/262 |
| 9,080,222 | B2 * | 7/2015 | Lengauer | ................. C21D 1/10 |
| 2005/0252588 | A1 * | 11/2005 | Machrowicz | .......... C21D 1/673 148/648 |
| 2007/0271978 | A1 * | 11/2007 | Brandstatter | .......... C21D 1/673 72/47 |

(Continued)

FOREIGN PATENT DOCUMENTS

| | | |
|---|---|---|
| CN | 1146389 A | 4/1997 |
| CN | 103468887 A | 12/2013 |

(Continued)

*Primary Examiner* — Veronica F Faison
(74) *Attorney, Agent, or Firm* — The Webb Law Firm

(57) ABSTRACT

A method for producing a profile includes method steps of: providing a workpiece; shaping the workpiece; joining the workpiece; coating the workpiece; heating the workpiece; and at least partially hardening the workpiece; wherein the coating method step is carried out temporally after the joining method step and temporally before the heating method step.

15 Claims, 1 Drawing Sheet

(56) References Cited

U.S. PATENT DOCUMENTS

| | | | |
|---|---|---|---|
| 2008/0011720 A1* | 1/2008 | Briand | B23K 26/1429 219/61 |
| 2008/0265626 A1* | 10/2008 | Dorr | B62D 21/11 296/204 |
| 2011/0274484 A1* | 11/2011 | Potthast | B23K 9/028 403/270 |
| 2013/0125607 A1 | 5/2013 | Samek et al. | |
| 2016/0122889 A1* | 5/2016 | Muhr | C25D 3/22 428/659 |
| 2016/0258035 A1* | 9/2016 | Gomez | C21D 9/08 |

FOREIGN PATENT DOCUMENTS

| | | |
|---|---|---|
| DE | 102010008990 A1 | 8/2011 |
| DE | 102010020373 A1 | 11/2011 |
| EP | 1651789 B1 | 5/2006 |
| GB | 2304066 A | 3/1997 |

* cited by examiner

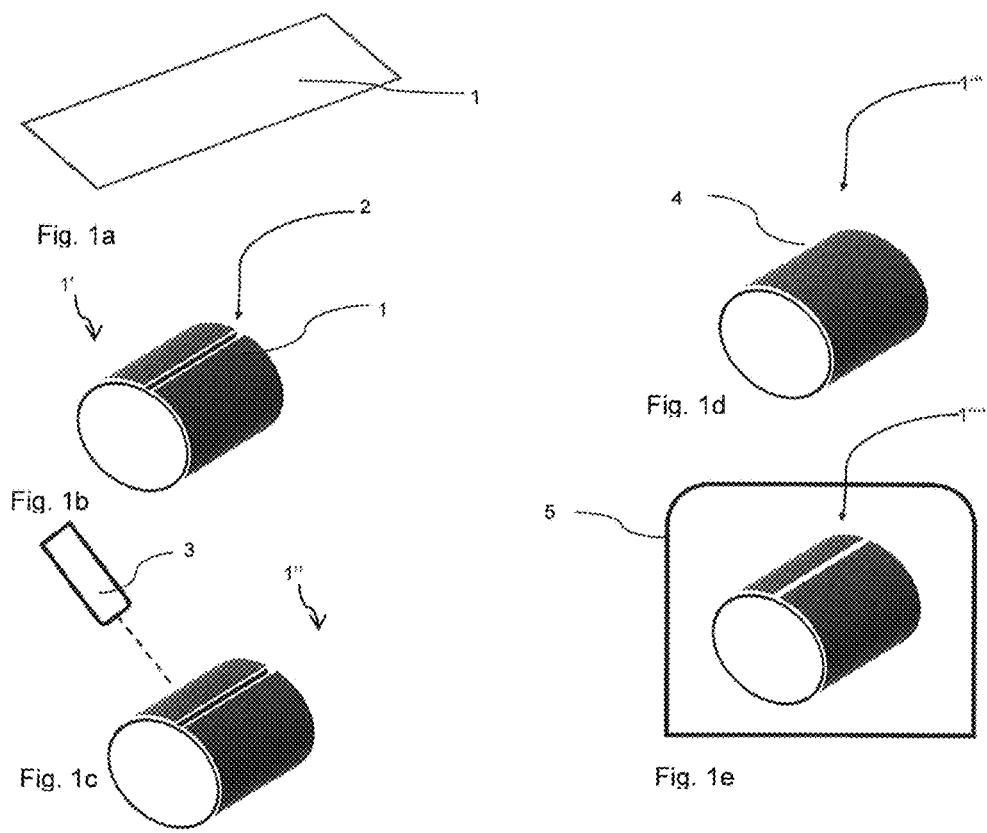
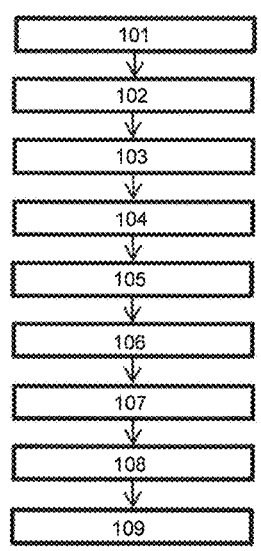

METHOD FOR PRODUCING A PROFILE AND A MANUFACTURING SYSTEM FOR PRODUCING A PROFILE

CROSS-REFERENCE TO RELATED APPLICATION

This application claims priority to German Patent Application No. 102014110564.8 filed Jul. 25, 2014, the disclosure of which is hereby incorporated in its entirety by reference.

BACKGROUND OF THE INVENTION

Field of the Invention

The present invention relates to a method for producing a profile and to a manufacturing system for producing a profile.

Description of Related Art

In the vehicle industry, use is increasingly made of press-hardened components composed of manganese-boron steels having tensile strengths of at least 1500 MPa. A large portion of said components is configured as a shell component. Shell components are typically designed with respect to the geometry thereof in such a manner that, after the production thereof, said shell components do not have a closed cross section. Only after two or more shell components are connected can said structure have a closed profile. However, structural measures are required in order to join the shell components. These include, for example, component flanges which can raise the entire weight of the finished profile. In addition, it is possible, for example during resistance spot welding, for the connection of the individual components to be present only locally and to be associated with an additional application of heat.

Precisely in the case of press-hardened components, a locally acting, retrospective heat treatment, for example in the course of resistance spot welding or soldering, may result in a metallurgical notch and may have a negative effect on the component function of the shaped part.

It is possible for downstream process steps to be reduced by the use of hollow profiles which, for the most part, already have the final constructional geometry thereof before the press-hardening. These profiles include, for example, rolling profiles or profiles produced by means of U and O bending processes. After the deformation, said profiles can be closed as a profile, for example, by means of laser beam welding. Subsequently, the final component properties are then produced by means of the shape hardening. For this purpose, the material, preferably a manganese-boron steel, is heated above the hardening temperature, in particular above Ac3, and subsequently hardened by cooling.

However, because of the heating process required for the hardening, thermal stressing of the components or material surface, in particular scaling or partial decarburization, takes place here. Since scaling has an adverse effect on the adhesion of paint, the hardened materials have to be cleaned at a cost here. At the same time, when coated material is used, flaking off of the coating may occur during cold deformation, as a result of which the adhesion of paint is also adversely affected in this case.

SUMMARY OF THE INVENTION

It is an object of the present invention to provide a method with which the probability of surface damage when hardening a shaped and joined workpiece is reduced.

The present invention is achieved by a method for producing a profile, comprising the following method steps:
providing a workpiece,
shaping the workpiece,
joining the workpiece,
coating the workpiece,
heating the workpiece,
at least partially hardening the workpiece,
characterized in that the coating method step is carried out temporally after the joining method step and temporally before the heating method step.

In comparison with the prior art, the shaped and joined workpiece is coated between the joining and the heating. By means of the coating, the workpiece is protected during heating against damage, in particular against surface damage, such as, for example, scaling or partial decarburization. In particular, it is possible by means of the method according to the invention to coat the workpiece in a joining region, i.e. in a workpiece region in which the workpiece is joined, and therefore likewise to protect said region against damage occurring by means of the heating during hardening.

A steel, in particular a manganese-boron steel, is preferably used as a material for the workpiece. It is conceivable in this case for the workpiece to be provided as a flat product. In particular, it is provided that, in the shaping method step, a hollow profile which is not yet closed is shaped and is closed in the joining method step. For this purpose, the workpiece is preferably connected to itself in the joining region. For the deformation in the second method step, hot or cold deformation, in particular roll profiling, rolling profiling and/or U and O bending, is provided. It is also conceivable for the deformation to comprise a deep-drawing process. As a final method step, the hardened workpiece is preferably provided as a profile, in particular as a hollow body or hollow profile.

Advantageous refinements and developments of the invention can be gathered from the dependent claims and from the description with reference to the drawings.

According to a further embodiment of the present invention, it is provided that, in the joining method step, the shaped workpiece is welded, preferably laser welded with a laser or laser beam. It is particularly preferably provided that, in the coating method step, a weld seam produced by welding is at least partially, preferably completely, coated. In particular, it is provided, in the laser welding process, that a laser beam is directed onto the workpiece, in particular onto the joining region of the workpiece, and connects, in particular welds, two ends of the workpiece in the joining region. By means of the coating, in particular a weld seam which is sensitive to the subsequent heating can be protected in an advantageous manner.

According to a further embodiment of the present invention, it is provided that, in the shaping method step, a slit is formed on the shaped workpiece by deformation. Two ends of the workpiece are preferably arranged aligned with each other in the region of the slit, and the shaped workpiece is closed to form a hollow profile by means of the joining.

According to a further embodiment of the present invention, it is provided that the coated workpiece is hardened in a shaping manner in a hardening tool. The workpiece is preferably subjected to shape hardening in the hardening tool, with the workpiece merely being deformed or calibrated to a comparatively small extent. As a result, the workpiece preferably obtains the final shape or design thereof.

According to a further embodiment of the present invention, it is provided that, in the coating method step, the joined workpiece is coated with a hot-dip coating process. It is preferably provided here that the joined workpiece is first of all heated and is subsequently dipped in a bath composed of liquid zinc (zinc alloy) or aluminum (aluminum alloy), in particular aluminum-silicon, and is coated. Furthermore, it is provided to remove excess zinc from the surface of the coated workpiece by means of a nozzle, preferably an air nozzle. In particular, it is provided to direct a gas flow emerging from the nozzle, in particular an air flow, onto the workpiece. A layer thickness of the coating is set or defined here in particular via the gas flow. Furthermore, a further nozzle is provided for the interior of the workpiece, in particular for the surface on the inner side of the hollow profile, said nozzle removing the excess zinc or aluminum, in particular aluminum-silicon, there. By means of the removal of the excess zinc, the tendency for zinc infiltration, i.e. for forming cracks in the workpiece of the material, can advantageously be suppressed. By means of the removal of the excess aluminum, in particular aluminum-silicon, the welding suitability of the workpiece can be improved in an advantageous manner.

In a further embodiment of the present invention, it is provided that, in the coating method step, the joined workpiece is coated with an electrolytic coating process. It is provided in particular that a pure zinc layer or a zinc and nickel layer is applied in the electrolytic coating process. A thermal process is substantially dispensed with here. The layer thickness of the coating is preferably set or defined by the duration of the coating process, i.e. the coating time, and the current levels used for the electrolytic coating process. By means of the electrolytic coating process with the possibility thereof of precise layer thickness control, a coating is provided in an advantageous manner which, in the heating method step, protects the workpiece against the heating effect.

According to a further embodiment of the present invention, it is provided that, in the coating method step, the joined workpiece is coated with an anti-scale layer in a painting process. It is provided here for an anti-scale layer having a zinc portion to be applied, for example by means of a painting nozzle. However, it is also conceivable for the anti-scale layer to be applied by at least partially dipping the workpiece into a painting bath. Following the application, the coating is preferably dried thermally between 50° C. and 300° C.

According to a further embodiment of the present invention, it is provided that, in a first intermediate step, the shaped workpiece is cleaned, wherein the first intermediate step is carried out temporally before the coating method step. Impurities, such as, for example, fats or oils, are preferably removed from the surface of the workpiece immediately before the coating. As a result, the adhesion and the quality of the applied coating can be improved in an advantageous manner.

According to a further embodiment of the present invention, it is provided that, in the heating method step, the coated workpiece is heated at least partially, preferably completely, to and/or above a hardening temperature, in particular to at least Ac3. As a result, a temperature-dependent conversion process required for the hardening is initiated. The workpiece, in particular a workpiece composed of a manganese-boron steel, is preferably heated to a temperature above 900° C. The heating is preferably realized with the aid of a heat source, such as, for example, a product carrier oven, wherein the heating speed, a holding duration and an oven atmosphere can be set, preferably within the product carrier oven.

According to a further embodiment of the present invention, it is provided that, in the hardening method step, the coated workpiece is transferred into a hardening tool.

According to a further embodiment of the present invention, it is provided that, in the hardening method step, the coated workpiece, which is at least partially heated, preferably completely heated, is cooled in the hardening tool. It is preferably provided here that the hardening tool is cooled or is cooled and is locally moderated, in order, for example, to set different material properties in the workpiece. In order to improve a cooling effect of the hardening tool, it is also conceivable for active cooling, for example in the form of a cooling medium, to be guided through the interior of the coated workpiece, in particular of the hollow profile. To avoid, for example, zinc infiltration, further deformations are omitted or the scope of further deformations is limited to a minimum extent, in particular to calibrating.

According to a further embodiment of the present invention, it is provided that, in a second intermediate step, the workpiece is trimmed. Parts which, in the production method, are provided as a mount or as a guide aid are preferably cut from the workpiece. It is conceivable here for the second trimming intermediate step to be carried out immediately before and/or after the joining method step and/or after the hardening method step.

According to a further embodiment of the present invention, it is provided that, after the hardening method step, the hardened workpiece is treated with a tempering treatment and/or with a peening process, preferably shot-peening process. By means of a peening process, in particular the shot-peening process, it is possible in an advantageous manner, after the hardening method step, to carry out possible correction measures for improving the quality of the surface. For example, such a measure may be of advantage if a workpiece can be welded only with difficulty, if at all, because of the coating thereof. Furthermore, it is conceivable that the hardening has led to an excessively high hardness value. By means of a tempering treatment taking place after the hardening method step, the workpiece can be hardened and tempered in an advantageous manner and the desired hardness value set.

According to a further embodiment of the present invention, it is provided that, in the providing method step, a semi-finished product is provided as the workpiece. In particular, it is conceivable for the semi-finished product to be a tailor welded coil or tailor welded blank or a tailor rolled product. The workpiece provided preferably comprises functional holes. As a result, after the method for producing the profile, it is possible to omit retrospectively introducing functional holes into the already coated shaped part.

The present invention further relates to a manufacturing system for producing a profile with a method according to one of the preceding claims, wherein the manufacturing system comprises
  a deformation apparatus for deforming the workpiece,
  a joining apparatus for joining the shaped workpiece,
  a coating apparatus for coating the joined workpiece,
  a heating apparatus for heating the coated workpiece, and
  a hardening tool for at least partially hardening the heated workpiece.

In comparison with the prior art, profiles, in particular a hollow profile, can be realized in series with the manufacturing system, wherein the tendency for scaling and/or partial decarburization is restricted in an advantageous manner in the production process.

Further details, features and advantages of the invention emerge from the drawings and from the description below of preferred embodiments with reference to the drawings. The drawings merely illustrate exemplary embodiments of the invention which do not restrict the inventive concept.

BRIEF DESCRIPTION OF THE DRAWINGS

FIGS. 1a to 1e show a method according to a first exemplary embodiment of the present invention.

FIG. 2 shows, in a block illustration, a method according to a second exemplary embodiment of the present invention.

DESCRIPTION OF THE INVENTION

In the various figures, identical parts are always provided with the same reference numbers and are therefore generally also referred to or mentioned only once in each case.

FIGS. 1a to 1e illustrate a method according to a first exemplary embodiment of the present invention. It is provided here that, in a first method step (the providing method step), a workpiece 1, as illustrated in FIG. 1a, is provided. The workpiece 1 is, for example, a hot strip or cold strip. It is conceivable for the workpiece 1 to be a semi-finished product, such as, for example, a tailor welded coil or tailor welded blank or a tailor rolled product, wherein the semi-finished product can have functional holes. Furthermore, it is provided that, in a second method step (the shaping method step), as indicated in FIG. 1b, the provided workpiece 1 is shaped. In the second method step, the workpiece 1 is preferably shaped by a deformation process, such as, for example, roll profiling, rolling profiling or U and O bending. In particular, it is provided that, for roll profiling in the second method step, a slit strip is provided in the first method step. With the deformation process, a shaped workpiece 1' with a slit 2 (slit profile) is preferably produced. That is to say, the shaped workpiece 1' preferably has a hollow profile which is closed apart from the slit 2. It is furthermore provided that, in the third method step (the joining method step), illustrated in FIG. 1c, said slit 2 is closed by the shaped workpiece 1' being joined. The shaped workpiece 1' is preferably welded here to itself, in particular laser welded by means of a laser 3. By means of the joining, in particular laser beam welding, the joined workpiece 1" is closed hollow profile. In a fourth method step (the coating method step) following the third method step, coating of the joined workpiece 1", in particular of the hollow profile which is closed per se, is provided. In particular, a weld seam 4 produced in the third method step is coated here. It is conceivable here for the joined workpiece 1" to be coated with a hot-dip coating process. It is provided in particular here that the joined workpiece 1" is initially heated and is subsequently dipped in a bath composed of liquid zinc (zinc alloy) or aluminum (aluminum alloy), in particular aluminum-silicon, and is coated. Furthermore, it is provided that excess zinc or aluminum, in particular aluminum-silicon, is removed from the surface in the hot-dip coating process by means of a nozzle, preferably an air nozzle. As a result, the probability of zinc infiltration, that is to say formation of cracks, into the workpiece 1 can be reduced in an advantageous manner and the welding suitability in the case of an aluminum coating can be improved. A gas flow, in particular air flow, leaving the nozzle is preferably directed here onto the surface of the joined workpiece 1". In particular, it is provided that, by means of blowing off brought about by means of the nozzle, a coating density of the coating on the joined workpiece 1" is defined or set. Furthermore, it is provided that, by means of a further nozzle in an interior of the joined workpiece 1", excess zinc or aluminium, in particular aluminum-silicon, is blown off in particular from the surfaces. However, it is also conceivable for the joined workpiece 1" to be coated by an electrolytic process. It is preferably provided here that a zinc layer, in particular a pure zinc layer, or a zinc and nickel layer is applied to the joined workpiece 1", wherein a coating density is defined by a coating time, that is to say the period of the electrolytic coating, and a current level which is used in the electrolytic coating process. The electrolytic coating is preferably carried out without heating. It is furthermore conceivable for the joined workpiece 1" to be coated with an anti-scale layer in a painting process. Preferably, anti-scale layers with zinc portions are applied to the shaped workpiece. Preferably, for the application, a painting nozzle is used or the joined workpiece 1" is at least partially dipped into a painting bath. Furthermore, it is provided that the antiscale layer is dried, preferably at temperatures between 50° C. and 300° C. In particular, it is provided that, in a fifth method step (the heating method step), the coated workpiece 1''' is heated by means of a heat source, such as, for example, a product carrier oven, wherein a heating speed, a holding duration and/or an oven atmosphere are coordinated to a material from which the workpiece 1 is manufactured. Subsequently, in a sixth method step (the hardening method step), the heated and coated workpiece 1''' is conveyed into a hardening tool 5 and is arranged in said hardening tool 5. This is indicated in FIG. 1e. The hardening tool 5 is preferably cooled or is cooled and locally tempered. It is also conceivable here for a cooling apparatus for active cooling to be arranged within the workpiece 1, preferably within the interior of the workpiece 1. In the hardening tool, deformations are preferably omitted, or a comparatively minor deformation, preferably calibration, is carried out in the hardening tool 5. By means of the method described, scaling during hardening can be avoided in an advantageous manner.

FIG. 2 illustrates, in a block illustration, a method for producing a shaped part according to a second exemplary embodiment of the present invention. In addition to the providing 101 of a workpiece, deformation 102, welding 103, coating 105, heating 106 and hardening 107, already known from the first embodiment, the method in the second embodiment also comprises cleaning 104 in a first intermediate step. The shaped workpiece is preferably cleaned temporally before the coating 105, in particular immediately therebefore. For example, it is conceivable for the shaped workpiece 1' or the joined workpiece 1" to be freed from oils and/or fats in a cleaning bath. Furthermore, it is provided that the workpiece 1 is trimmed, in particular cut to size, in a second intermediate step. It is conceivable here for such a component trimming 108 to take place within the scope of a seventh method step. However, it is also conceivable for the second intermediate step to be carried out temporally before the fourth method step (the coating method step), in particular temporally before the first intermediate step. Furthermore, it is provided that, after the sixth method step (the hardening method step), the hardened workpiece 1'''' is subjected to a surface treatment, for example a peening process 109. For example, when the need arises, surface corrections to the hardened workpiece 1'''' are carried out by means of a shot-peening process. It is also conceivable that, after the sixth method step, the hardened workpiece 1'''' is tempered, i.e. is subjected to a tempering treatment, if a hardness value lying outside a tolerance range is ascertained for the workpiece 1''''. However, it is also conceivable that the hardened workpiece 1'''' does not require any subsequent treatment and is provided as a profile.

LIST OF REFERENCE NUMBERS 1 workpiece
1' shaped workpiece
1'' joined workpiece
1''' coated workpiece
1'''' hardened workpiece
2 slit
3 laser
4 weld seam
5 hardening tool
101 providing a workpiece
102 deforming
103 welding
104 cleaning
105 coating
106 heating
107 hardening
108 component trimming
109 peening process

The invention claimed is:

1. A method for producing a profile, comprising the following method steps:
   providing a workpiece,
   shaping the workpiece,
   joining the workpiece,
   coating the workpiece,
   heating the workpiece, and
   at least partially hardening the workpiece,
   wherein the coating method step is carried out temporally after the joining method step and temporally before the heating method step and the coated workpiece is hardened in a shaping manner in a hardening tool.

2. The method according to claim 1, wherein, in the joining method step, the shaped workpiece is welded.

3. The method according to claim 1, wherein, in the shaping method step, a slit is formed in the shaped workpiece by deformation.

4. The method according to claim 1, wherein, in the coating method step, the joined workpiece is coated with a hot-dip coating process.

5. The method according to claim 1, wherein, in the coating method step, the joined workpiece is coated with an electrolytic coating process.

6. The method according to claim 1, wherein, in the coating method step, the joined workpiece is coated with an anti-scale layer in a painting process.

7. The method according to claim 1, further comprising cleaning the workpiece before the coating method step.

8. The method according to claim 1, wherein, in the heating method step, the coated workpiece is heated to a hardening temperature.

9. The method according to claim 1, wherein, in the hardening method step, the coated workpiece is transferred into a hardening tool.

10. The method according to claim 9, wherein, in the hardening method step, the coated workpiece is cooled in the hardening tool.

11. The method according to claim 1, further comprising trimming the workpiece.

12. The method according to claim 1, wherein, after the hardening method step, the hardened workpiece is treated with a tempering treatment and/or with a peening process.

13. A manufacturing system for producing a profile according to claim 1, wherein the manufacturing system comprises:
   a deformation apparatus for deforming the workpiece;
   a joining apparatus for joining the shaped workpiece;
   a coating apparatus for coating the joined workpiece;
   a heating apparatus for heating the coated workpiece; and
   a hardening tool for at least partially hardening the heated workpiece.

14. The method according to claim 2, wherein the shaped workpiece is welded with a laser.

15. The method according to claim 8, wherein the coated workpiece is heated to at least Ac3.

* * * * *